E. G. HINES.
DRAFT HEAD FOR PLOW BEAMS.
APPLICATION FILED APR. 10, 1919.
1,344,131.
Patented June 22, 1920.
2 SHEETS—SHEET 1.
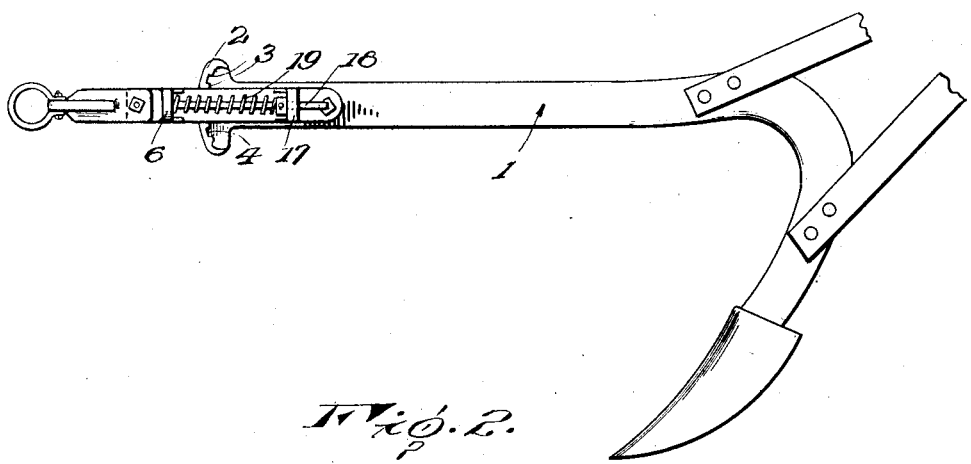
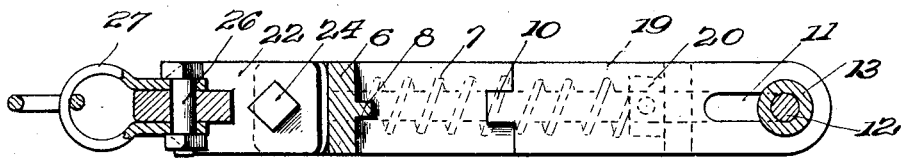
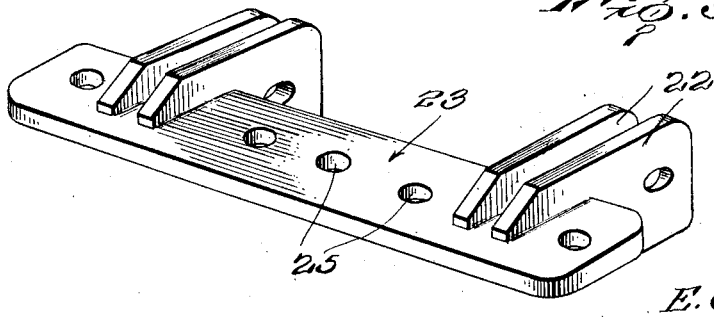
INVENTOR
E. G. Hines.
by Lacey & Lacey, Attys.

E. G. HINES.
DRAFT HEAD FOR PLOW BEAMS.
APPLICATION FILED APR. 10, 1919.
1,344,131.
Patented June 22, 1920.
2 SHEETS—SHEET 2.
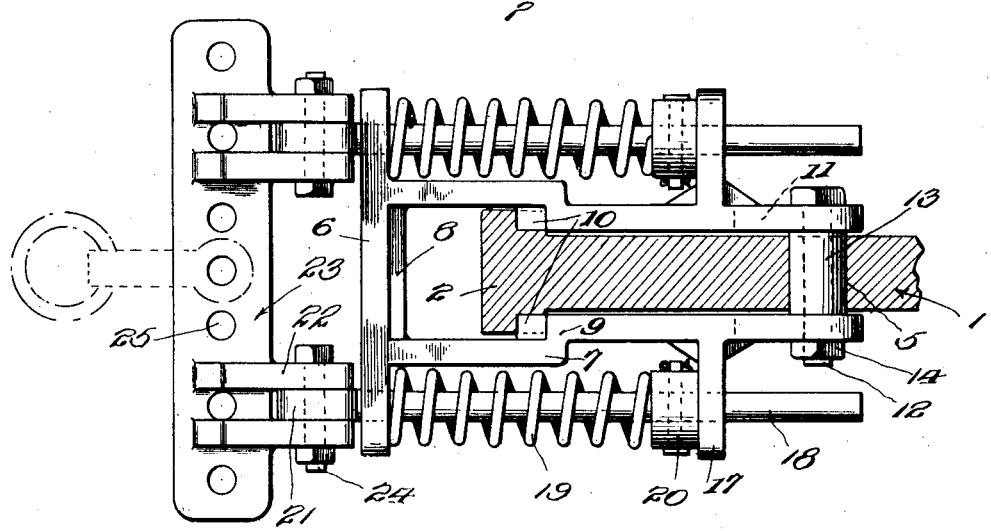
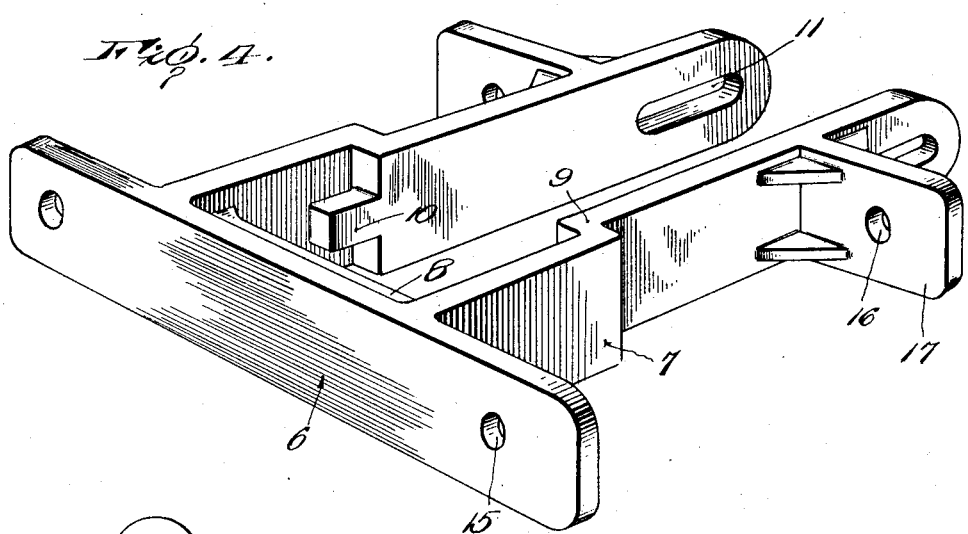
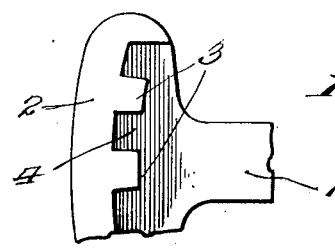
INVENTOR
E. G. Hines.

UNITED STATES PATENT OFFICE.

EDWIN G. HINES, OF DRUMS, PENNSYLVANIA.

DRAFT-HEAD FOR PLOW-BEAMS.

1,344,131.

Specification of Letters Patent. Patented June 22, 1920.

Application filed April 10, 1919. Serial No. 288,951.

*To all whom it may concern:*

Be it known that I, EDWIN G. HINES, a citizen of the United States, residing at Drums, in the county of Luzerne and State of Pennsylvania, have invented certain new and useful Improvements in Draft-Heads for Plow-Beams, of which the following is a specification.

This invention relates to draft heads for plow-beams and has as its object to provide a draft device of this class so constructed that any sudden shocks such as those occasioned for example when the plowshare strikes a clod, stump, or other obstruction, will be absorbed so that there will be no likelihood of breakage of any of the plow parts or of the traces or other members of the harness, and so that the draft animals will not be subjected to the additional strains incident to the striking of the plowshare against such obstructions.

Another object of the invention is to provide in a draft device of the class stated, forwardly yieldable means, and a draft bar pivotally supported by said means and extending transversely of the end of the plow-beam and adapted for the connection therewith of the clevis, the clevis being adjustable longitudinally along the said draft bar.

A further object of the invention is to provide a draft device for plow-beams which may be readily applied to the ordinary plow-beam now in use without any alteration of the beam and which will be adapted to coact with the beam in such a manner that the said device may be held at various positions of adjustment so as to locate the draft bar at a higher or lower elevation as desired.

In the accompanying drawings:

Figure 1 is a side elevation of the draft head embodying the present invention mounted upon a plow-beam;

Fig. 2 is a vertical longitudinal sectional view taken centrally through the head removed from the plow-beam;

Fig. 3 is a top plan view of the draft head applied to the beam, the beam being shown in section;

Fig. 4 is a perspective view of the head proper removed from the beam;

Fig. 5 is a perspective view of the draft bar detached;

Fig. 6 is a detail fragmentary side elevation of a portion of the head of the plow-beam.

In the drawings the numeral 1 indicates in general the beam of a plow to which beam the draft head of the present invention is to be applied. At its forward end the beam 1 is provided with the usual arcuate head 2 the side faces of which are formed with the usual rack teeth 3 and intervening notches 4, the beam rearwardly of its head being provided with the usual transverse opening 5, concentric to the arc of curvature of the rack for the passage of the usual bolt for connecting the ordinary draft head or clevis to the beam.

The head proper of the device embodying the present invention comprises a forward connecting portion 6 and spaced side members 7 which extend rearwardly from the rear face of the portion 6 in substantially parallel relation, the head as a whole being preferably in the nature of an integral casting. The connecting member 6 of the head may be reinforced by a suitable reinforcing rib 8 upon its rear face and the members 7 may likewise be reinforced in any desired manner. Near their forward ends, the members 7 are offset inwardly toward each other as at 9 and the inner faces of the offsets are formed each with a tooth 10, the teeth lying opposite each other and being designed to engage in the notches 4 between the teeth 3 of the rack head 2 of the plow-beam in a manner which will presently be explained. In order that the head may be connected with the beam 1 for angular adjustment, the members 7 of the said head are formed at their rear ends with longitudinally extending slots 11, and a bolt 12 is passed through these slots and through a sleeve 13 which is disposed between the said rear ends of the members 7 and fits within the opening 5 and constitutes a bushing to reduce the diameter of the said opening. A nut 14 is threaded onto the bolt 12 and when this nut is tightened it will bear against the outer face of one of the side members 7, and the head of the bolt will bear against the outer face of the other side member 7, the sleeve 13 abutting at its ends, however, against the inner or opposed faces of the said side members so as to relatively brace these members and thus prevent them being drawn together when the nut is tightened. It will be evident by reference to Fig. 3 of the drawings that when the head has been assembled with the plow-beam and has been shifted forwardly so as to cause its teeth 10 to engage between the teeth 3 of the head 2 at the opposite sides of the said beam, the bolt 12 will be positioned in the rear ends of the slots 11, the head of the bolt and the said nut binding the ends of the members 7 against the ends of the sleeve 13 so as to prevent any rearward shifting movement or displacement of the head with relation to the bolt and plow-beam. Thus when the head has been adjusted to the desired position and the nut 14 has been tightened, the said head will be held against accidental movement out of its position of adjustment but when it is desired to raise or lower the said head with relation to the end of the plow-beam, the nut 14 is loosened whereupon the head may be shifted rearwardly with relation to the beam and the said bolt 12 until the bolt is positioned substantially within the forward ends of the slots 11 at which time the teeth 10 will be out of engagement with the rack teeth 3 and the head may be swung upwardly or downwardly as desired. Of course, after having been brought to the proper position it is to be again shifted in a forward direction and the nut 14 tightened as before stated.

The connecting forward member 6 of the head projects at its opposite ends beyond the respective side members 7 and each projecting end of this member is formed with an opening 15, these openings being in front to rear alinement with similar openings 16 formed through guiding ears or lugs 17 which are formed upon the outer faces of the said side members 7 near their rear ends. Slidably fitted in the openings 15 and 16 at each side of the head is a draw rod 18, and fitted upon each of these rods is a spring 19 which bears at its forward end against the rear side of the corresponding projecting end of the connecting member 6 of the head. The rear ends of the springs bear against abutment elements preferably comprising collars or nuts 20 either secured or threaded upon the respective draw rods 18, and these collars normally bear against the forward faces of the respective ears or lugs 17, as clearly shown in Fig. 3 of the drawings, thus holding the rods 18 shifted in a rearward direction, the springs 19 yieldably resisting any forward movement of the rods. The rods at their forward ends are provided with ears 21 which are received between spaced pintle ears 22 formed upon and projecting beyond the rear edge of the draw bar of the device which bar is indicated by the numeral 23. Pivot bolts 24 are fitted through the ears 21 and 22 in the manner shown in Fig. 3 of the drawings and thus the draw bar is pivotally supported by the forward ends of the draft rods 18. The said draw bar is formed with a longitudinally extending series of openings 25, and the bolt 26 of the clevis 27 may be fitted through these openings interchangeably so as to provide for adjustment of the clevis longitudinally along the draft bar 23.

From the foregoing it will be evident that any forward pull upon the draw bar 23 will result in a forward movement of the bar against the tension of the springs 19 away from the head of the device and the forward end of the plow-beam. Thus when the plow meets with obstructions, the sudden shock is absorbed by the said springs 19 thus relieving the harness and draft animals of strain and preventing breakage of the harness and the plow.

Having thus described the invention, what is claimed as new is:

1. In a draft device of the class described, a member for attachment to a plow-beam or the like, rods slidably mounted upon the member at the opposite sides thereof, springs yieldably resisting the forward movement of the rods, and a draft bar to which the said rods are pivotally connected, the said draft bar being provided with a longitudinally extending series of openings for the attachment for a clevis.

2. In a draft device of the class described, the combination with a plow-beam having its head provided with an arcuate rack and which beam is formed with an opening concentric to the arc of curvature of the rack, of a draw head assembled with the beam, a bolt carried by the draw head and fitting in the said opening to pivotally connect the draw head with the beam, the said draw head having a slot through which the bolt extends whereby the head may be shifted longitudinally of the plow beam, and a tooth carried by the head and engageable with the teeth of the rack when the head is shifted in a forward direction.

3. In a draft device of the class described, the combination with a plow-beam having a head provided with arcuate racks at its opposite sides and formed with an opening concentric to the arc of curvature of the racks, of a draw head including side members, the draw head being disposed with its side members lying at opposite sides of the beam, the said side members having longitudinally extending slots, a bolt fitted through the opening in the plow-beam and through the slots in the side members of the draw head whereby to pivotally connect the draw head with the beam and also to provide for shifting of the draw head longitudinally of the beam, and teeth carried by the said side members of the draw head for coaction with the teeth of the racks of the head of the plow-beam.

4. In a draft device of the class described, the combination with a plow-beam having a head provided with arcuate racks at its opposite sides and formed with an opening concentric to the arc of curvature of the racks, of a draw head including side members, the draw head being disposed with its side members lying at opposite sides of the beam, the said side members of the draw head having longitudinally extending slots, a sleeve fitted through the opening in the plow-beam and abutting at its ends against the inner faces of the said side members of the draw head, a bolt fitted through the slots in the said side members and through the sleeve, a nut threaded upon the bolt, and teeth carried by the said side members for coaction with the rack teeth of the head of the plow-beam.

5. In a draft device of the class described, the combination with a plow-beam provided with a head having an arcuate rack, of a draw head pivotally and shiftably connected with the beam at a point concentric to the rack, and a tooth carried by the draw head for coaction with the rack.

6. In a draft device of the class described, a member for attachment to a plow beam or the like and provided with spaced guide elements at each of its sides, rods slidably mounted in the said guide elements, a spring upon each of the rods bearing at one end against one of the respective guide elements, an abutment upon each rod against which the other end of the respective spring bears, the abutment upon each rod coacting with the other one of the respective guide elements to limit the sliding movement of the respective rod under the influence of the respective spring, and a draft bar supported by the forward ends of the rods.

In testimony whereof I affix my signature.

EDWIN G. HINES. [L. S.]